(12) United States Patent
Koda et al.

(10) Patent No.: US 11,637,942 B2
(45) Date of Patent: Apr. 25, 2023

(54) MULTIFUNCTION PERIPHERAL WITH EXTERIOR MEMBER DIFFERENT FROM INPUT UNIT

(71) Applicant: FUJIFILM Business Innovation Corp., Tokyo (JP)

(72) Inventors: Kazuyuki Koda, Kanagawa (JP); Tomonori Sato, Kanagawa (JP); Ryusuke Nakata, Kanagawa (JP); Miho Morita, Kanagawa (JP); Tomomi Ishida, Kanagawa (JP); Isamu Adachi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/543,705

(22) Filed: Dec. 6, 2021

(65) Prior Publication Data

US 2023/0060035 A1 Feb. 23, 2023

(30) Foreign Application Priority Data

Aug. 23, 2021 (JP) .............................. JP2021-135492

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *H04N 1/195* | (2006.01) |

(52) U.S. Cl.
CPC ..... *H04N 1/00663* (2013.01); *H04N 1/00411* (2013.01); *H04N 1/00477* (2013.01); *H04N 1/19594* (2013.01); *H04N 2201/0094* (2013.01)

(58) Field of Classification Search
CPC .......... H04N 1/00663; H04N 1/00411; H04N 1/00477; H04N 1/19594; H04N 2201/0094
USPC ............................... 358/1.15, 1.14, 1.13, 1.1
See application file for complete search history.

(56) References Cited

U.S. PATENT DOCUMENTS

| | | | |
|---|---|---|---|
| 2021/0064315 A1* | 3/2021 | Kurita | ................... G06F 3/1253 |
| 2021/0112169 A1* | 4/2021 | Sakaguchi | ......... H04N 1/00411 |
| 2021/0120137 A1 | 4/2021 | Okamoto et al. | |
| 2021/0365898 A1* | 11/2021 | Watanabe | .............. G07D 11/26 |

FOREIGN PATENT DOCUMENTS

JP 2021068980 4/2021

* cited by examiner

*Primary Examiner* — Douglas Q Tran
(74) *Attorney, Agent, or Firm* — JCIPRNET

(57) ABSTRACT

A multifunction peripheral includes an exterior member that corresponds to an exterior portion of the multifunction peripheral and that differs from an input unit that inputs an instruction for a program, a reception unit that receives an instruction for performing a process that involves an operation of the exterior member, and a notification unit that notifies a user of a position on the exterior member to be operated by the user of the multifunction peripheral when the process is performed in a case where the reception unit receives the instruction for performance.

20 Claims, 11 Drawing Sheets

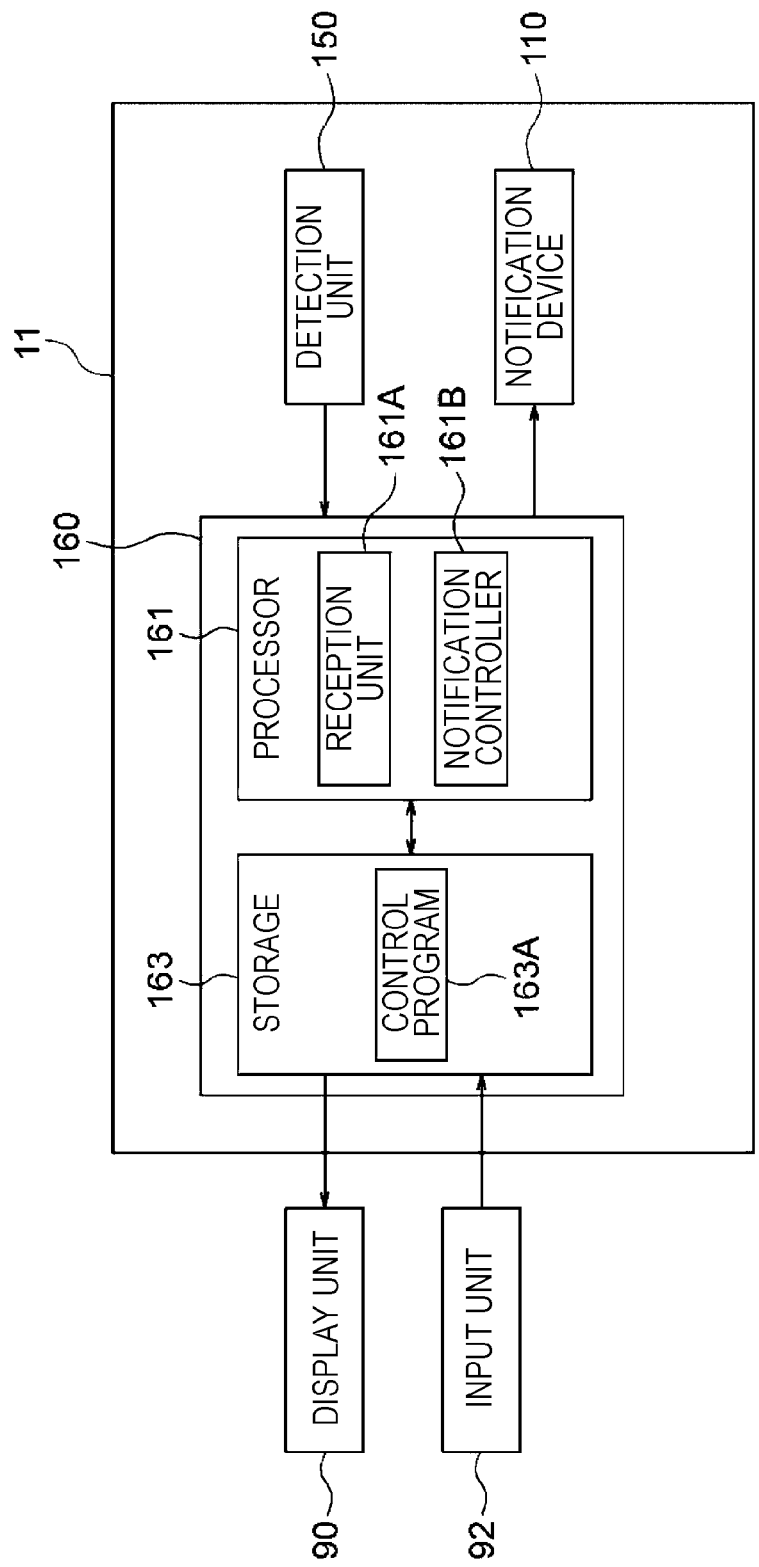

MULTIFUNCTION PERIPHERAL WITH EXTERIOR MEMBER DIFFERENT FROM INPUT UNIT

CROSS-REFERENCE TO RELATED APPLICATIONS

This application is based on and claims priority under 35 USC 119 from Japanese Patent Application No. 2021-135492 filed Aug. 23, 2021.

BACKGROUND

(i) Technical Field

The present disclosure relates to a multifunction peripheral.

(ii) Related Art

Japanese Unexamined Patent Application Publication No. 2021-68980 discloses an image reading device that includes a document placing table that includes an image reader and an auto document feeder that is rotatably supported by the document placing table such that the auto document feeder is rotatable between a closed position at which the auto document feeder covers an upper surface of the document placing table and an opened position at which the auto document feeder uncovers the upper surface of the document placing table. Japanese Unexamined Patent Application Publication No. 2021-68980 also discloses an image forming apparatus that includes the image reading device described above.

SUMMARY

In an example case, a user operates an exterior member that corresponds to an exterior portion of a device and that differs from an input unit that inputs an instruction for a program such as a UI touch screen or a keyboard, for example, the user opens or closes a covering that covers the device. In the example case, a position on the exterior member to be operated is indicated by using printed characters on the exterior member or by changing the shape of the exterior member from that of another exterior member. However, the device that uses this method over the whole of the exterior member to be operated has poor appearance.

Aspects of non-limiting embodiments of the present disclosure relate to improvement in the appearance of a multifunction peripheral at an exterior member to be operated even with a position on the exterior member indicated to the user in the case where the user operates the exterior member that corresponds to an exterior portion of the multifunction peripheral, unlike the case where characters are printed on the entire exterior member or the overall shape of the exterior member differs from that of another exterior member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a multifunction peripheral including an exterior member that corresponds to an exterior portion of the multifunction peripheral and that differs from an input unit that inputs an instruction for a program, a reception unit that receives an instruction for performing a process that involves an operation of the exterior member, and a notification unit that notifies a user of a position on the exterior member to be operated by the user of the multifunction peripheral when the process is performed in a case where the reception unit receives the instruction for performance.

BRIEF DESCRIPTION OF THE DRAWINGS

Exemplary embodiments of the present disclosure will be described in detail based on the following figures, wherein:

FIG. 11 is a block diagram illustrating an example of the functional configuration of a processor of the control device according to the exemplary embodiment.

DETAILED DESCRIPTION

An exemplary embodiment of the present disclosure will hereinafter be described by way of example with reference to the drawings.

Multifunction Peripheral 10

Figure 1:
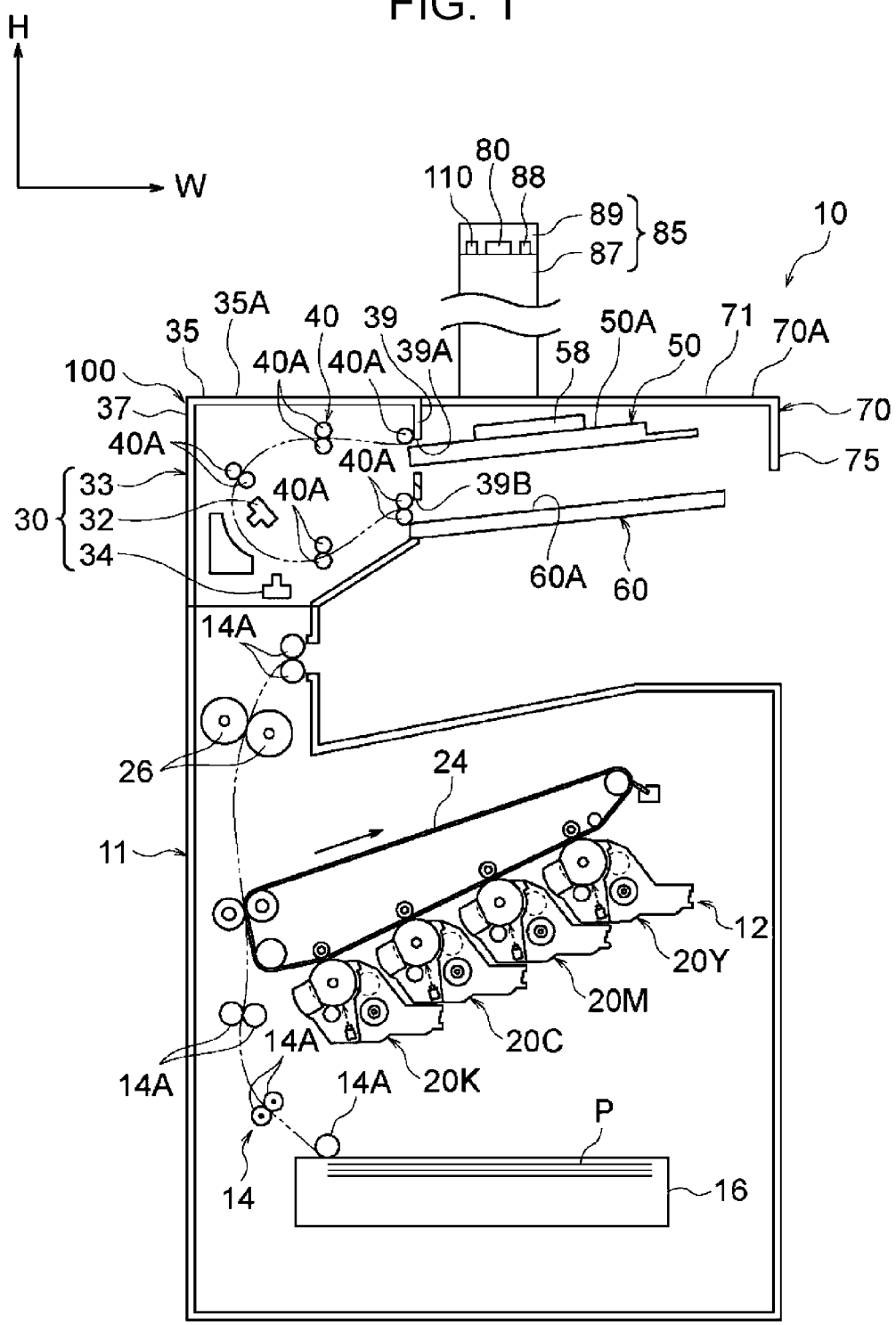
FIG. 1 schematically illustrates a multifunction peripheral according to an exemplary embodiment.

A multifunction peripheral 10 according to the exemplary embodiment will be described. FIG. 1 schematically illustrates the multifunction peripheral 10 according to the exemplary embodiment. An arrow H illustrated in figures represents a vertical direction of the multifunction peripheral. An arrow W represents a width direction of the multifunction peripheral (specifically, a horizontal direction). An arrow D represents a depth direction of the multifunction peripheral (specifically, a horizontal direction). The vertical direction of the multifunction peripheral, the width direction of the multifunction peripheral, and the depth direction of the multifunction peripheral intersect each other (specifically, at right angles).

Figure 10:
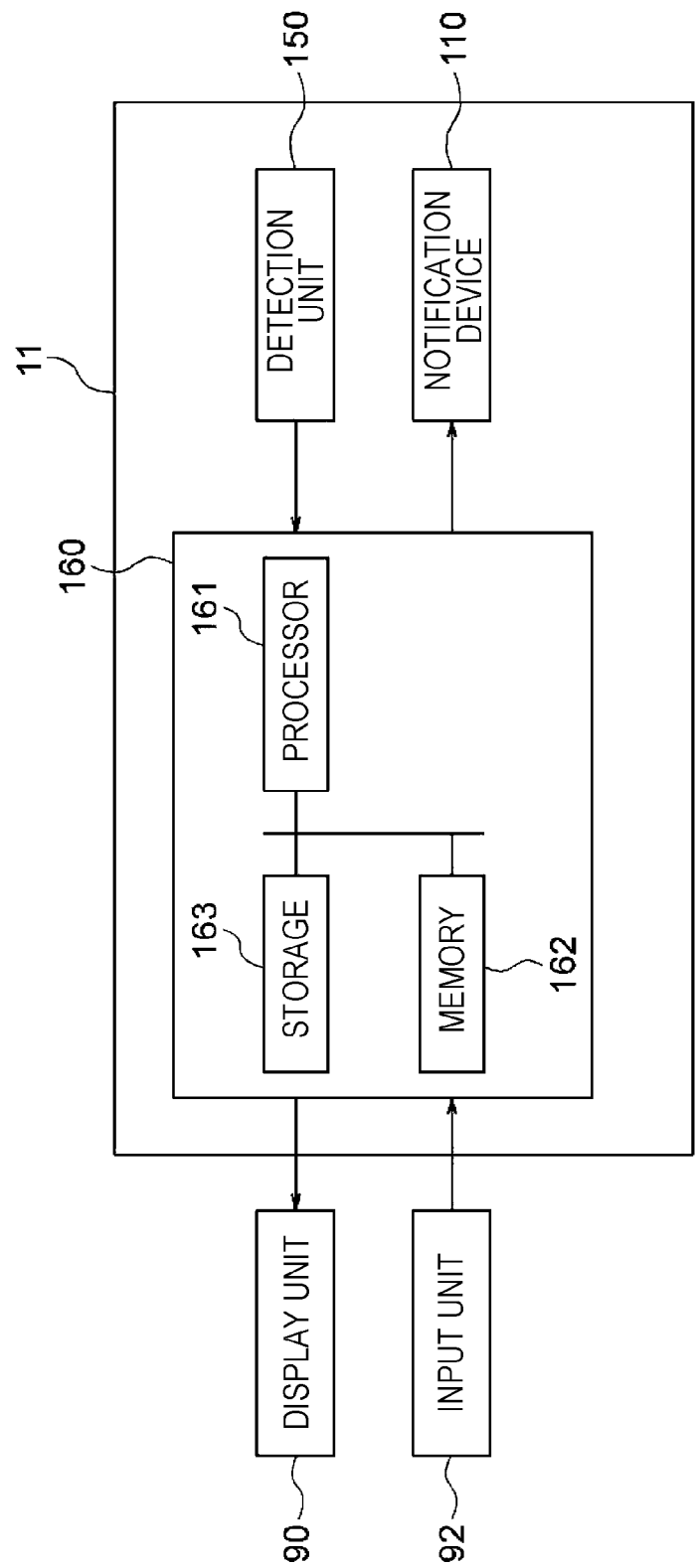
FIG. 10 is a block diagram illustrating an example of the hardware configuration of a control device according to the exemplary embodiment.

The multifunction peripheral 10 illustrated in FIG. 1 is capable of performing various processes in response to instructions from a user who uses the multifunction peripheral 10. Specifically, the multifunction peripheral 10 is capable of performing at least a scan process, a copy process, and a print process in response to instructions from the user. Specifically, as illustrated in FIG. 1, the multifunction peripheral 10 includes a transport unit 14, an image forming unit 12, a reading unit 30, a transport mechanism 40, a document table 50, a discharge portion 60, a document table 70, a camera 80, and an exterior member 100. As illustrated in FIG. 10, the multifunction peripheral 10 also includes a display unit 90, an input unit 92, a notification device 110, a detection unit 150, and a control device 160.

According to the exemplary embodiment, the multifunction peripheral 10 has a function of forming an image and may be thought to be an image forming apparatus as described later. The multifunction peripheral 10 also has a function of reading an image and may be thought to be an image reading apparatus as described later. The multifunction peripheral 10 also has a function of performing various processes and may be thought to be a process performing apparatus as described later.

Transport Unit 14 and Image Forming Unit 12

The transport unit 14 (see FIG. 1) transports a recording medium P such as a sheet that is contained in a container unit 16. Specifically, as illustrated in FIG. 1, the transport unit 14 includes transport members 14A such as multiple transport rollers and transports the recording medium P by using the transport members 14A.

The image forming unit 12 (see FIG. 1) forms an image on the recording medium P that is transported by the transport unit 14. The image forming unit 12 is capable of forming an image that is read by the reading unit 30 or the camera 80 on the recording medium P.

Specifically, the image forming unit 12 forms a toner image (an example of an image) on the recording medium P by using an electrophotographic system. Specifically, as illustrated in FIG. 1, the image forming unit 12 includes toner image forming members 20Y, 20M, 20C, and 20K (referred to below as 20Y to 20K), a transfer body 24, and fixing portions 26.

As for the image forming unit 12, the toner image forming members 20Y to 20K perform charging, exposing, developing, and transferring processes and form toner images in respective colors of yellow (Y), magenta (M), cyan (C), and black (K) on the transfer body 24. The image forming unit 12 transfers the toner images in the respective colors that are formed on the transfer body 24 to the recording medium P. The fixing portions 26 fix the toner images to the recording medium P. The image forming unit 12 thus uses an intermediate transfer system that transfers the images to the recording medium P via the transfer body 24.

Reading Unit 30 and Transport Mechanism 40

The reading unit 30 illustrated in, for example, FIG. 1 is a component that reads the image of a document G (see FIG. 3 and FIG. 5) that is transported. As illustrated in FIG. 1, the reading unit 30 is disposed above the image forming unit 12. Specifically, the reading unit 30 includes reading sensors 32 and 34 and a covering 33.

The reading sensor 32 is a functional unit that has a function of reading an image on one of surfaces of the document G that is transported. The reading sensor 34 is a functional unit that has a function of reading an image on the other surface of the document G that is transported. Examples of the reading sensors 32 and 34 include a contact image sensor abbreviated as a CIS.

The covering 33 is a component that covers the reading sensor 32. Specifically, as illustrated in FIG. 1, the covering 33 includes a top plate 35 and side plates 37 and 39.

Figure 2:
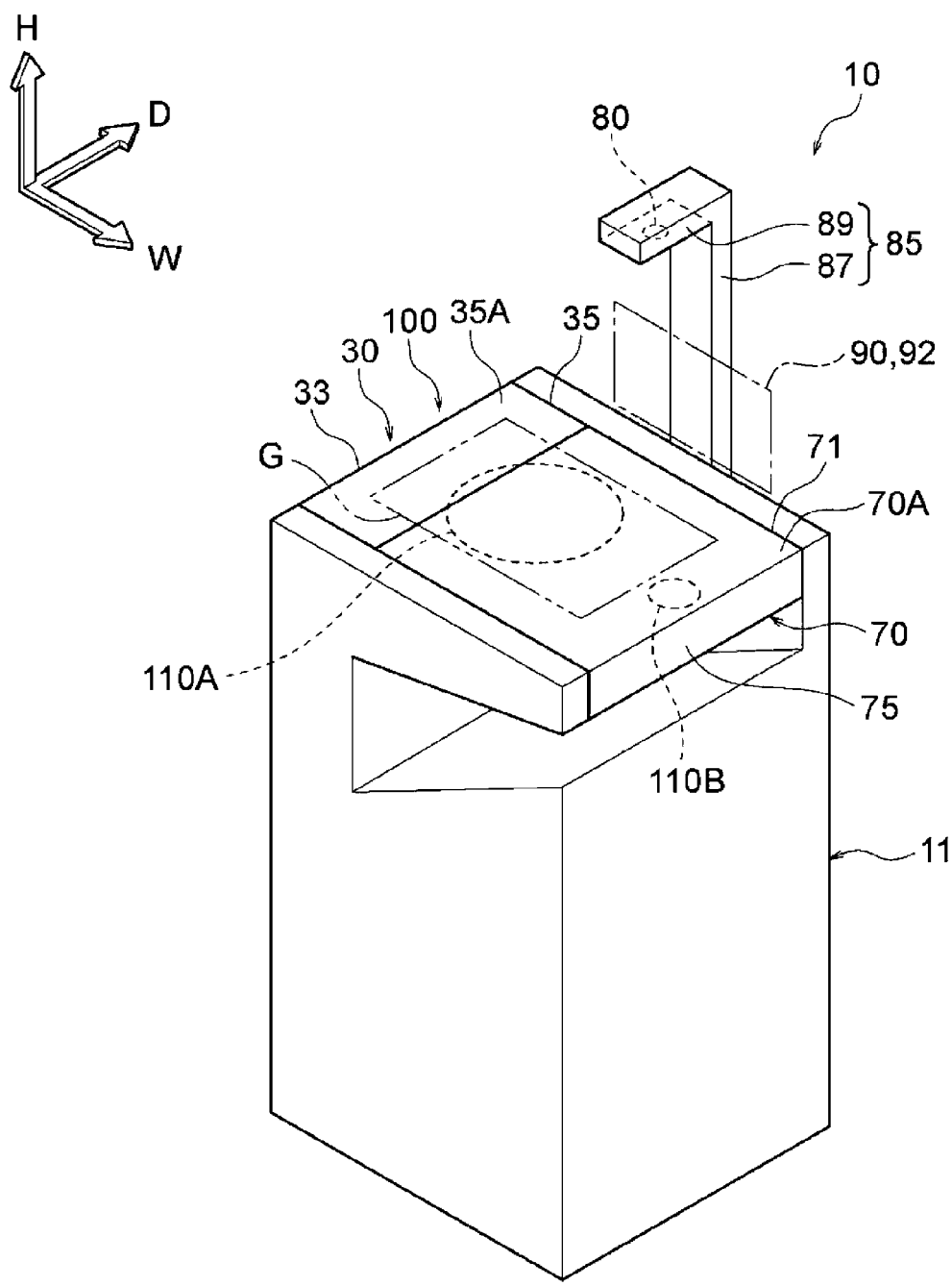
FIG. 2 is a perspective view of the multifunction peripheral according to the exemplary embodiment.
Figure 4:
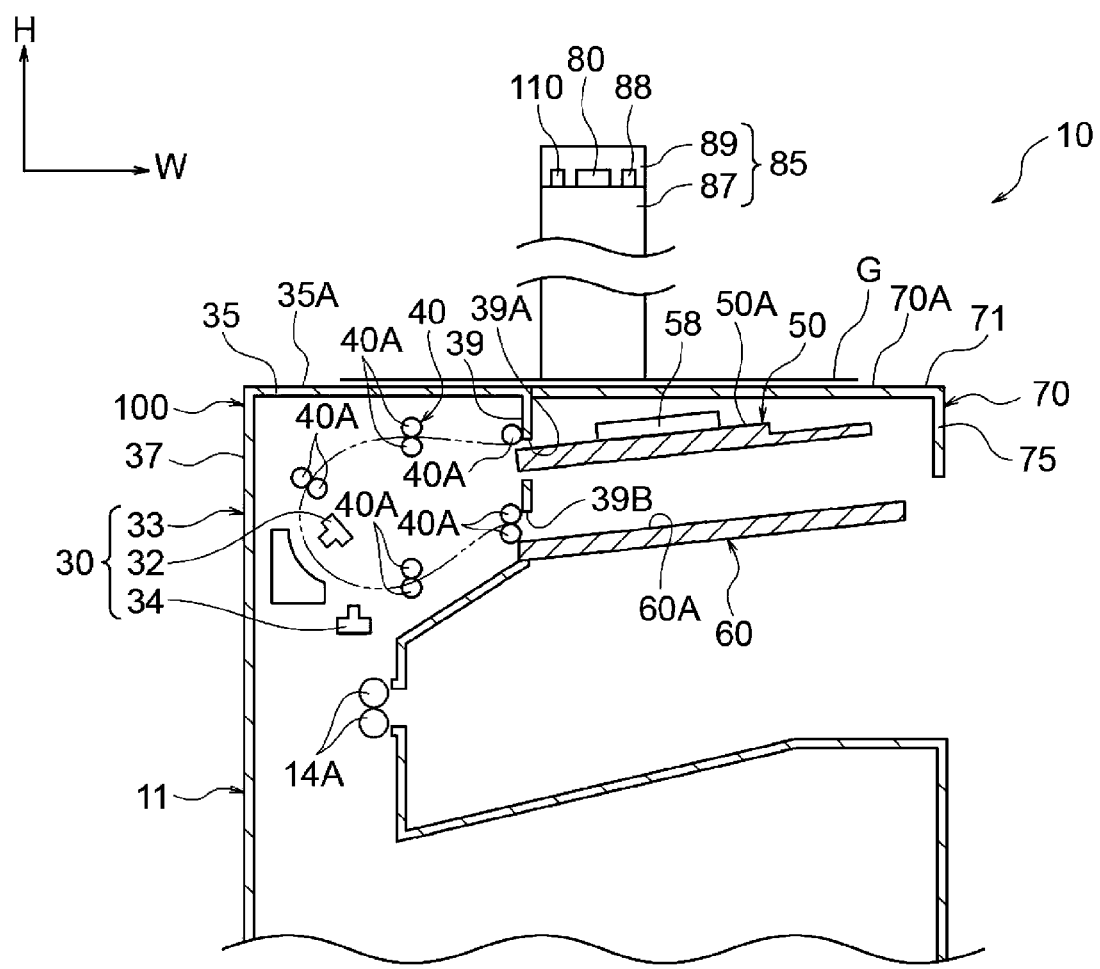
FIG. 4 is a sectional view of an upper portion of the multifunction peripheral according to the exemplary embodiment.

The top plate 35 is disposed above the reading sensor 32 and covers the reading sensor 32 from above. As illustrated in FIG. 2 and FIG. 4, a part of the document G the image of which is read by the camera 80 is placed on the top plate 35.

The side plate 37 is disposed at a position away from the reading sensor 32 in one of the width directions of the multifunction peripheral (the left-hand direction in FIG. 1) and covers the reading sensor 32 from the position away therefrom in the one of the width directions of the multifunction peripheral. The side plate 39 is disposed at a position away from the reading sensor 32 in the other width direction of the multifunction peripheral (the right-hand direction in FIG. 1) and covers the reading sensor 32 from the position away therefrom in the other width direction of the multifunction peripheral.

The one of the width directions of the multifunction peripheral corresponds to the left-hand direction of the multifunction peripheral 10, and accordingly, the one of the width directions of the multifunction peripheral is referred to below as the left-hand direction. The other width direction of the multifunction peripheral corresponds to the right-hand direction of the multifunction peripheral 10, and accordingly, the other width direction of the multifunction peripheral is referred to below as the right-hand direction. These directions are defined for convenience of description, and the configuration of the multifunction peripheral is not limited by the directions.

The side plate 39 has an inlet 39A via which the document G that is placed on the document table 50 enters a location inside the covering 33. The inlet 39A is configurated as an opening that extends in the depth direction of the multifunction peripheral.

An outlet 39B via which the document G is discharged from the location inside the covering 33 onto the discharge portion 60 is formed below the inlet 39A of the side plate 39. The outlet 39B is configurated as an opening that extends in the depth direction of the multifunction peripheral.

The transport mechanism 40 transports the document G the image of which is read by the reading unit 30. The transport mechanism 40 is disposed inside the covering 33. In other words, the transport mechanism 40 is covered by the covering 33.

Specifically, the transport mechanism 40 includes multiple transport members 40A such as transport rollers. The transport mechanism 40 transports the document G that is placed on the document table 50 from the inlet 39A to the outlet 39B (that is, the discharge portion 60) along a C-shaped transport path by using the transport members 40A.

As for the multifunction peripheral 10, the transport mechanism 40 thus transports the document G from the document table 50 to the discharge portion 60, and the reading unit 30 reads the image of the document G that is transported by the transport mechanism 40.

Document Table 50

Figure 3:
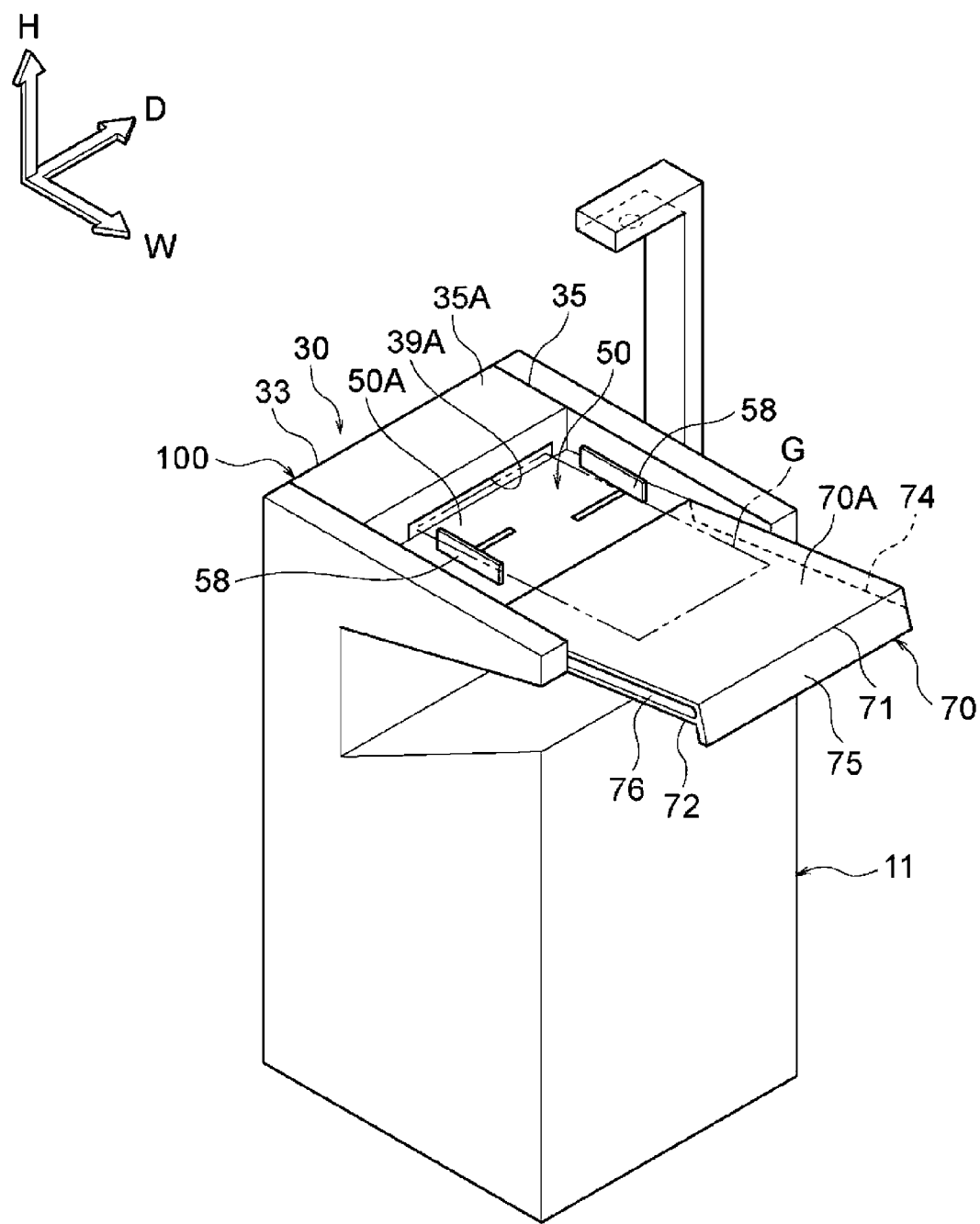
FIG. 3 is a perspective view of the configuration illustrated in FIG. 2 with a document table moved to an open position.
Figure 5:
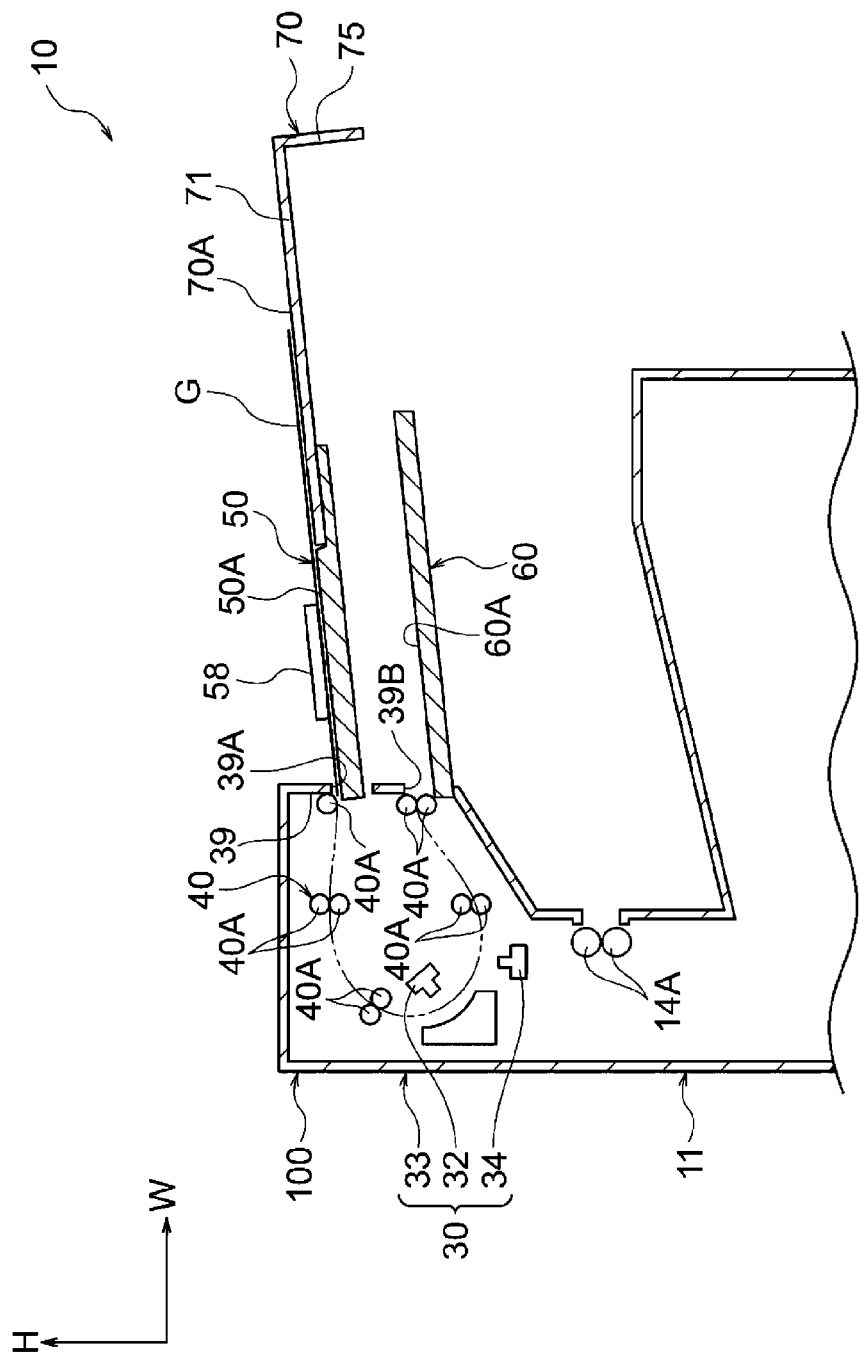
FIG. 5 is a sectional view of the configuration illustrated in FIG. 4 with the document table moved to the open position.
Figure 7:
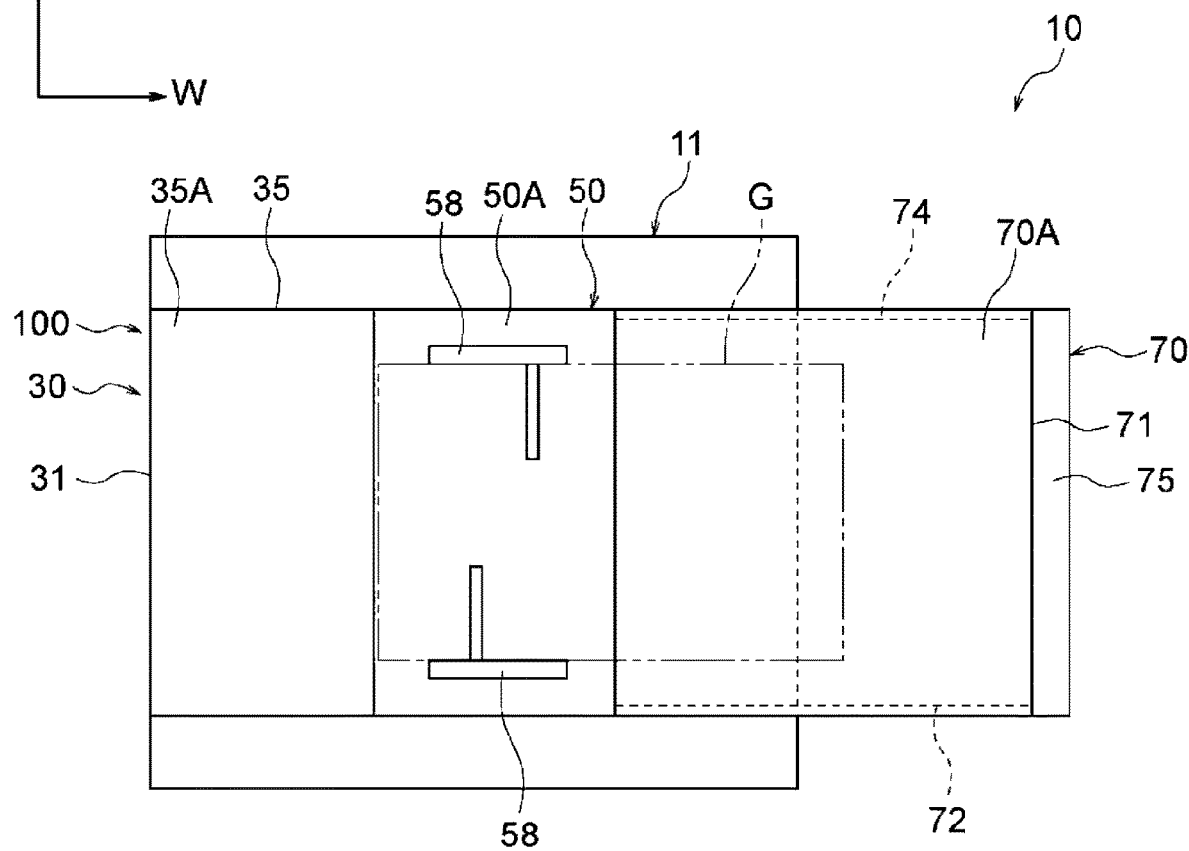
FIG. 7 is a plan view of the configuration illustrated in FIG. 6 with the document table moved to the open position.

As illustrated in FIG. 3, FIG. 5, and FIG. 7, the document table 50 is a table on which the document G the image of which is read by the reading unit 30 (see FIG. 1) is placed. That is, the document table 50 may be referred to as a component on which the document G that is transported by the transport mechanism 40 (see FIG. 1) is placed. The document table 50 is an example of a placement portion.

As for the document table 50, the document G is placed on an upper surface 50A. Accordingly, the upper surface 50A of the document table 50 is referred to as a placement surface on which the document G is placed. According to the exemplary embodiment, the document G is placed on the document table 50 from above with the document table 70 positioned at an open position as described later.

According to the exemplary embodiment, the meaning of the "document table" represents a component on which the document G is placed. Accordingly, the meaning of the "table" does not include a meaning that specifies a shape.

As illustrated in FIG. 1, the document table 50 is disposed adjacent to the reading unit 30 in the right-hand direction. The document table 50 is disposed below the document table 70 and below a top surface 35A of the top plate 35. Accordingly, there is a step between the upper surface 50A of the document table 50 and the top surface 35A of the top plate 35.

The document table 50 has a plate shape that extends from the side plate 39 of the covering 33 in the right-hand direction. The upper surface 50A of the document table 50 extends from the inlet 39A in the right-hand direction. The upper surface 50A is an inclined surface that gradually extends upward from the inlet 39A while extending in the right-hand direction.

As illustrated in FIG. 3 and FIG. 7, the document table 50 includes a restriction portion 58 (a so-called a side guide). The restriction portion 58 comes into contact with side edges of the document G that is placed on the document table 50 and restricts movement of the document G in both of the depth directions of the multifunction peripheral.

One of the depth directions of the multifunction peripheral corresponds to the front direction of the multifunction peripheral 10, and accordingly, the one of the depth directions of the multifunction peripheral is referred to below as the front direction. The other depth direction of the multifunction peripheral corresponds to the rear direction of the multifunction peripheral 10, and accordingly, the other depth direction of the multifunction peripheral is referred to below as the rear direction. These directions are defined for convenience of description, and the configuration of the multifunction peripheral is not limited by the directions.

Discharge Portion 60

The discharge portion 60 illustrated in, for example, FIG. 5 is a component onto which the document G the image of which is read by the reading unit 30 is discharged. That is, the discharge portion 60 may be referred to as a component on which the document G that is transported by the transport mechanism 40 is placed. As for the discharge portion 60, the document G is placed on an upper surface 60A. Accordingly, the upper surface 60A of the discharge portion 60 is referred to as a placement surface on which the document G is placed.

The discharge portion 60 is disposed below the top surface 35A of the top plate 35 and below the document table 50. The discharge portion 60 has a plate shape that extends from the side plate 39 of the covering 33 in the right-hand direction.

The upper surface 60A of the discharge portion 60 extends from the outlet 39B in the right-hand direction. The upper surface 60A is configurated as an inclined surface that gradually extends upward from the outlet 39B while extending in the right-hand direction.

Document Table 70

As illustrated in FIG. 2 and FIG. 4, the document table 70 is a table on which the document G the image of which is read by the camera 80 is placed. The document table 70 is an example of a movement unit and an example of a table.

As for the document table 70, the document G is placed on an upper surface 70A. Accordingly, the upper surface 70A of the document table 70 is referred to as a placement surface on which the document G is placed. As illustrated in FIG. 4, the upper surface 70A of the document table 70 is flush with the top surface 35A of the top plate 35. That is, the upper surface 70A of the document table 70 and the top surface 35A of the top plate 35 are on the same plane.

The document table 70 is disposed above the discharge portion 60 and above the document table 50. Accordingly, the document table 70 covers the upper surface 50A of the document table 50 from above.

Figure 6:
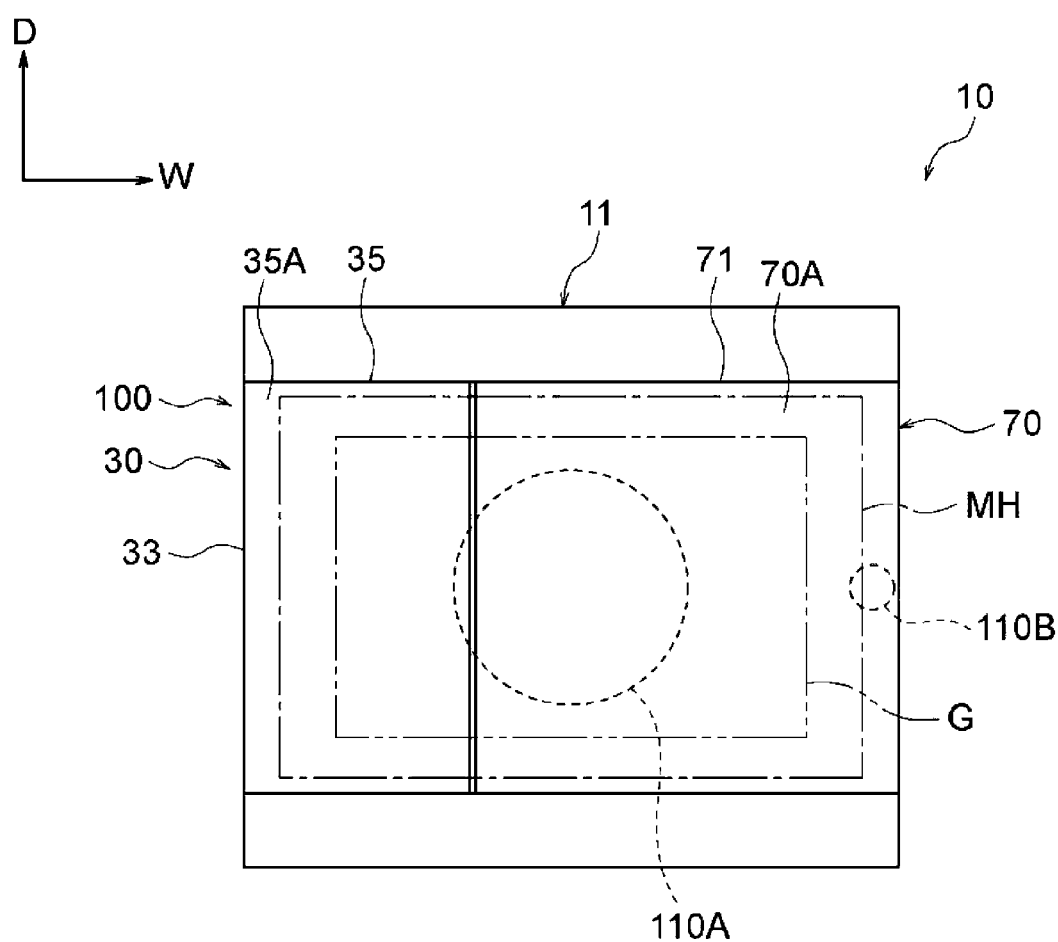
FIG. 6 is a plan view of the multifunction peripheral according to the exemplary embodiment.

Specifically, as illustrated in FIG. 3, the document table 70 includes a top plate 71 and side plates 72, 74, and 75. The top plate 71 has a plate shape the thickness direction of which coincides with the vertical direction as illustrated in FIG. 4 and has a substantially rectangular shape in a plan view as illustrated in FIG. 6. As for the document table 70, as illustrated in FIG. 2, FIG. 4, and FIG. 6, the document G is placed on the top plate 71. Accordingly, the upper surface of the top plate 71 configurates the upper surface 70A of the document table 70.

As illustrated in FIG. 4, the top plate 71 is disposed above the document table 50. The dimensions of the top plate 71 in the width direction of the multifunction peripheral and in the depth direction of the multifunction peripheral are larger than the dimensions of the document table 50 in the width direction of the multifunction peripheral and in the depth direction of the multifunction peripheral.

The side plate 75 extends downward from a right-hand edge portion of the top plate 71. The side plate 75 has a plate shape the thickness direction of which coincides with the width direction of the multifunction peripheral. The side plate 75 is disposed at a position away from the document table 50 in the right-hand direction and covers the document table 50 from the position away therefrom in the right-hand direction.

The side plates 72 and 74 extend downward from a front edge portion and a rear edge portion of the top plate 71 (see FIG. 3). The side plates 72 and 74 have a plate shape the thickness direction of which coincides with the depth direction of the multifunction peripheral. The side plates 72 and 74 are disposed at positions in front of and behind the document table 50 and cover the document table 50 from the positions in front of and behind the document table 50.

The document table 70 is movable to a covering position (a position illustrated in FIG. 1, FIG. 2, FIG. 4, and FIG. 6) at which the document table 70 covers the document table 50 from above and an open position (a position illustrated in FIG. 3, FIG. 5, and FIG. 7) at which the document table 70 uncovers the upper surface of the document table 50. According to the exemplary embodiment, the document table 70 is supported by a multifunction peripheral body 11 that serves as a support body so as to be movable to the covering position and the open position.

Figure 8:
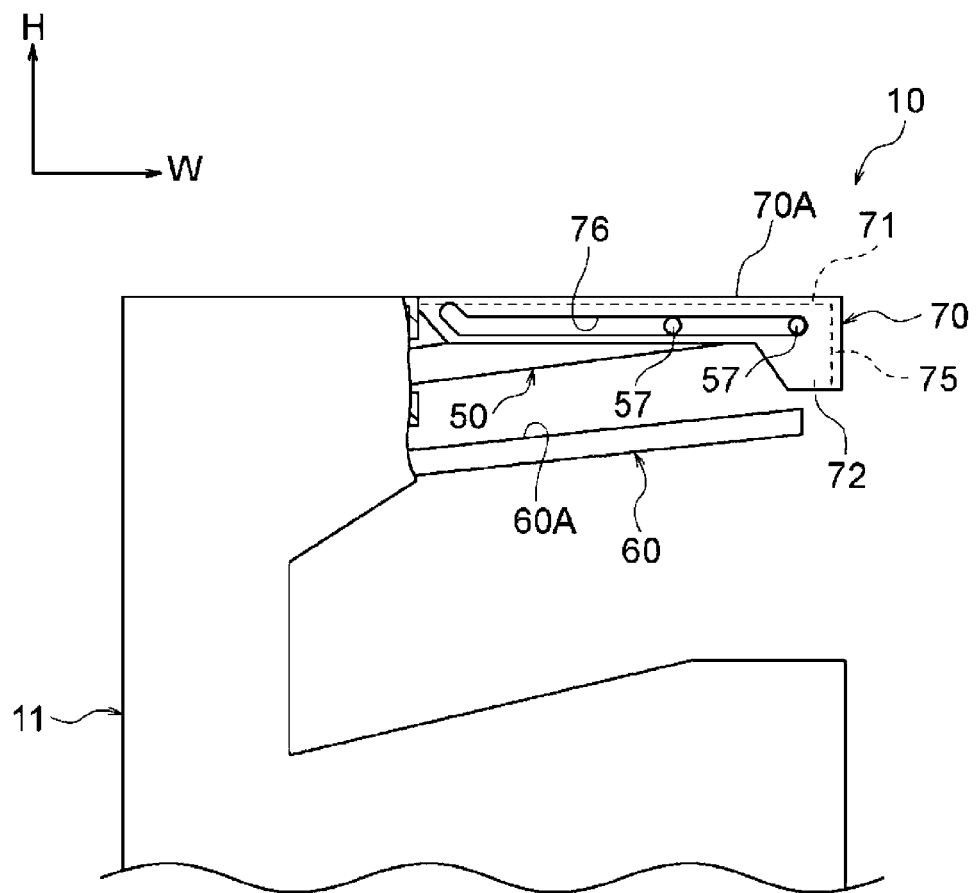
FIG. 8 is a sectional view of a movement mechanism in the multifunction peripheral according to the exemplary embodiment.
Figure 9:
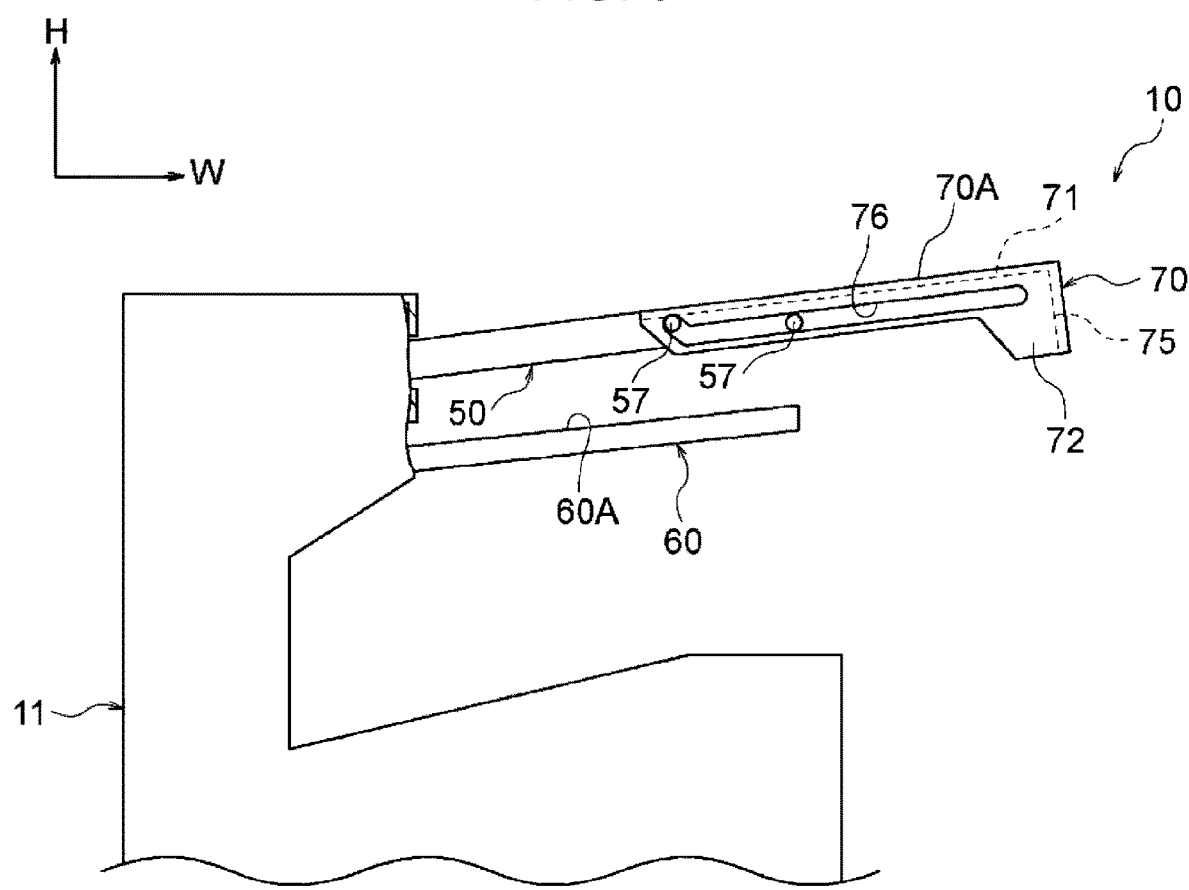
FIG. 9 is a sectional view of the configuration illustrated in FIG. 8 with the document table moved to the open position.

As illustrated in FIG. 8 and FIG. 9, the side plates 72 and 74 include respective rails 76 that have long holes that extend in a left-right direction. Shafts 57 that are disposed on the front surface and rear surface of the document table 50 are inserted in the rails 76. The shafts 57 guide the document table 70 to the covering position (a position illustrated in FIG. 8) and the open position (a position illustrated in FIG. 9) along the rails 76. The document table 70 moves between the covering position (the position illustrated in FIG. 8) and the open position (the position illustrated in FIG. 9) in the width directions of the multifunction peripheral.

As illustrated in FIG. 3, FIG. 5, and FIG. 7, the document table 70 is located opposite the document table 50 with respect to the reading unit 30 (that is, away therefrom in the right-hand direction) when being positioned at the open position. A part of the document G that is placed on the document table 50 is placed on the document table 70 that is positioned at the open position.

The multifunction peripheral 10 thus includes a movement mechanism that moves the document table 70 by using the shafts 57 and the rails 76. The movement mechanism is not limited by the configuration described above and may be configured by using various mechanical factors.

The document table 70 has a function of a covering that covers the document table 50 as described above. That is, the document table 70 doubles as the covering that covers the document table 50. The document table 70 has the function of the covering and may be thought to be the covering (a covering member) of the document table 50.

As for the document table 70, the side plate 75 functions as a portion on which the user exerts movement force for moving the document table 70. In a specific example, the user inserts the hand into a location inside the side plate 75 from below the side plate 75 (that is, in the left-hand direction) and exerts the movement force on the side plate 75 for moving the document table 70 that is positioned at the covering position to the open position. The user exerts the movement force on the side plate 75 from the outside (that is, a position away therefrom in the right-hand direction) for moving the document table 70 that is positioned at the open position to the covering position.

An example of the portion for exertion may be a handle that is disposed on the side plate 75 of the document table 70. For example, the user may insert the hand into a long hole that is formed in the side plate 75 of the document table 70 and exert the movement force on the side plate 75. The portion for exertion may be disposed on a portion that differs from the side plate 75 of the document table 70, provided that the movement force is exerted on the document table 70.

Camera 80

The camera 80 is a camera (a so-called a document camera) that is capable of reading the image of the document G (an example of an object) that is placed on the document table 70. The camera 80 is disposed above the document table 70. The camera 80 faces downward and is capable of reading the image of the document G that is placed on the upper surface 70A of the document table 70.

An example of the camera 80 is a digital camera that includes an optical system such as a lens and an imaging element that converts photosensitivity into an electrical signal. Examples of the imaging element include a charge coupled device (CCD) and a complementary metal oxide semiconductor (CMOS). The optical axis of the camera 80 coincides with, for example, the vertical direction when viewed from the front.

The camera 80 is supported by a support portion 85 that is disposed on the multifunction peripheral body 11. The support portion 85 includes a support rod 87 that extends upward from the multifunction peripheral body 11 at the rear of the document table 70 and a mounting portion 89 that extends forward from an upper end portion of the support rod 87. The camera 80 is mounted on the mounting portion 89. An illumination device 88 that illuminates the document G when the document G is imaged by the camera 80 is mounted on the mounting portion 89. The illumination device 88 includes a light source such as a LED and illuminates the document G by using the light source.

As illustrated in FIG. 6, the reading range MH of the camera 80 is across the reading unit 30 and the document table 70. The top surface 35A of the top plate 35 of the reading unit 30 and the upper surface 70A of the document table 70 are flat in the reading range MH of the camera 80. According to the exemplary embodiment, the entire top surface 35A of the top plate 35 and the entire upper surface 70A of the document table 70 are flat.

The meaning of "being flat" described herein represents that the surfaces are flat to such an extent that the document G that is supported has a posture that is suitable for being read by the camera 80, and unevenness is permitted provided that the document is supported in the posture that is suitable for being read by the camera 80. The posture of the document G that is suitable for reading is a smooth posture that enables at least the degree of a warp to be smaller than that in the case where the document G (specifically, plain paper) is placed across the top surface 35A of the top plate 35 and the upper surface 50A of the document table 50.

The top surface 35A of the top plate 35 of the reading unit 30 and the upper surface 70A of the document table 70 may be perpendicular to the optical axis of the camera 80. As for the multifunction peripheral 10, at least an angle between the top surface 35A and the optical axis of the camera 80, that is, the vertical direction and an angle between the upper surface 70A and the vertical direction are smaller than an angle between the upper surface 50A of the document table 50 and the vertical direction when viewed from the front.

As for the multifunction peripheral 10, the camera 80 reads the image in a manner in which the document G is placed on the document table 70 that is positioned at the covering position and the top surface 35A of the top plate 35 of the reading unit 30, and the document G is imaged by the camera 80. The image is formed on the document G and includes, for example, a character, a picture, and a photograph.

The top surface 35A and the upper surface 70A that function as the placement surfaces on which the document G is placed may not be flat. That is, the top surface 35A and the upper surface 70A may not be flat, provided that the top surface 35A and the upper surface 70A enable the document G that is placed on the top surface 35A and the upper surface 70A to be imaged by the camera 80. Accordingly, for example, the top surface 35A and the upper surface 70A may have unevenness, provided that the document G is placed on the top surface 35A and the upper surface 70A and imaged by the camera 80.

Display Unit 90 and Input Unit 92

The display unit 90 (see FIG. 10 and FIG. 11) displays various kinds of information such as the content and kind of an instruction that is inputted by the input unit 92, and various messages that represent, for example, guidance about a user operation. The display unit 90 is configured by using, for example, a liquid-crystal display or an organic electro-luminescence (EL) display.

The input unit 92 (see FIG. 10 and FIG. 11) is a component into which the user inputs various instructions that include an instruction for running a program. The input unit 92 is configured by using, for example, an operation unit into which the user manually inputs various instructions that include the instruction for running the program. Specifically, the input unit 92 is configured by using, for example, a touch screen and a keyboard. When the input unit 92 is a touch screen, the display unit 90 and the input unit 92 may be integrated into a touch screen display. In an example according to the exemplary embodiment, the display unit 90 and the input unit 92 are integrated and used as a touch screen display. For example, as illustrated in FIG. 2, the touch screen display is mounted on the support rod 87.

Examples of the instructions that are inputted by the input unit 92 include instructions for performing various processes such as the scan process, the copy process, and the print process. The instructions for performing the processes include various instructions that are inputted by the input unit 92 when the processes are performed. Examples of the various instructions include inputting a selected process to be performed by using the input unit 92 and inputting a set process condition for performing a process by using the input unit 92.

For example, inputting the set process includes inputting the process that is to be performed by the user and that is selected from various processes (for example, the scan process, the copy process, and the print process) that are displayed on the display unit 90 by using the input unit 92.

For example, inputting the set process condition includes inputting the process condition that the user sets by using the input unit 92, based on a process condition that is displayed on the display unit 90. Examples of the process condition for the scan process include reading resolution, a reading method (reading with the reading unit 30 or reading with the camera 80), and a color setting (for example, monochrome reading or color reading). Examples of the process condition for the copy process include the size of the recording medium P and magnification in addition to the reading resolution, the reading method, and the color setting described above.

The input unit 92 may be configured so as to receive the gesture of the user. With this configuration, for example, the input unit 92 includes a recognition unit such as a camera that recognizes the gesture of the user, and the recognition unit recognizes the gesture of the user for input.

The input unit 92 may be configured so as to receive the voice of the user. With this configuration, for example, the input unit 92 includes a recognition unit that recognizes the voice of the user such as a microphone, and the recognition unit recognizes the voice of the user for input. The input unit 92 may receive an instruction such as a voice instruction or a gesture instruction in a non-contact manner.

Exterior Member 100

The exterior member 100 differs from the input unit 92 and corresponds to an exterior portion of the multifunction peripheral 10. That is, the exterior member 100 does not include the input unit 92 that include a touch screen and a keyboard. The exterior member 100 may be referred to as a component that the user visually recognizes from a location outside the multifunction peripheral 10 and is able to touch. The exterior member 100 includes at least the covering 33, the document table 50, the discharge portion 60, and the document table 70 described above.

Examples of the process that may be instructed to be performed by using the input unit 92 include a process (referred to below as a process A) that involves the operation of the exterior member 100. Examples of the process A include the copy process and the scan process. The copy process and the scan process are performed by reading the image by using the camera 80 or the reading unit 30. Accordingly, the copy process and the scan process correspond to an example of a process that includes reading with the reading unit and an example of a process that includes reading with the camera.

In the copy process and the scan process, the case where the image is read by the camera 80 involves the operation of the exterior member 100 such as an operation (referred to below as a placement operation) of placing the document G on the document table 70 and the covering 33.

In the copy process and the scan process, the case where the image is read by the reading unit 30 involves the operation of the exterior member 100 such as an operation (referred to below as a movement operation) of moving the document table 70 that is positioned at the covering position to the open position.

Accordingly, the covering 33, the document table 50, and the document table 70 in the exterior member 100 correspond to portions that are operated by the user when the process A is performed. These portions may be referred to as objects to be operated by the user.

The covering 33, the document table 50, and the document table 70 to be operated correspond to exterior members that are provided as upper portions of the multifunction peripheral 10. Specifically, the covering 33, the document table 50, the discharge portion 60, and the document table 70 are disposed at heights such that the user is able to operate these with the user standing.

The exterior member 100 does not include the input unit 92 as described above, and the operation of the exterior member 100 does not include operating the input unit 92.

The placement operation and the movement operation described above are preparation operations that are performed before the process A is performed to prepare for performing the process A. Accordingly, the operation of the exterior member 100 may also be referred to as the preparation operation. The placement operation and the movement operation described above may also be referred to as user operations of moving, for example, members (specifically, the document G and the document table 70). Accordingly, the operation of the exterior member 100 may also be referred to as a user operation of moving, for example, a member.

Notification Device 110

In the case where a reception unit 161A described later receives the instruction for performing the process A, the notification device 110 (see FIG. 10 and FIG. 11) notifies the user of a position (also referred to below as an operation position) on the exterior member 100 to be operated by the user when the process A is performed. The notification device 110 displays the operation position of the exterior member 100 on the exterior member 100.

The notification device 110 displays the operation position by lighting up the operation position of the exterior member 100. The notification device 110 lights up the operation position of the exterior member 100 by illuminating the operation position of the exterior member 100. The meaning "lighting up" described herein represents emitting luminescence. The meaning of "illuminating" represents irradiation with light by using a light source that is disposed separately from an object to be lighted up. Accordingly, examples of the case of "lighting up" include the case where the object to be lighted up is illuminated and the case where the object to be lighted up itself emits luminescence. The notification device 110 is an example of a notification unit.

As for the multifunction peripheral 10, as illustrated in FIG. 4, the notification device 110 is configured by using, for example, the illumination device that includes the light source such as a LED that is mounted on the mounting portion 89. For example, the notification device 110 illuminates a partial range or the entire range at the operation position by using the light source. The notification device 110 may include multiple light sources depending on the number of the operation position for illumination. That is, the notification device 110 may be configured so as to include multiple light sources that illuminate the respective operation positions. The light source of the notification device 110 differs from the light source of the illumination device 88.

In the case where the operation of the exterior member 100 is the operation of placing the document G on the document table 70 and the covering 33, the operation position is a position (referred to below as a placement position) at which the user places the document G on the document table 70 and the covering 33. As illustrated in FIG. 2 and FIG. 6, for example, the notification device 110 illuminates a range 110A in a central portion at the placement position from above the document table 70 and the covering 33. In other words, the notification device 110 illuminates the central portion in the reading range MH of the camera 80. According to the exemplary embodiment, a portion across the document table 70 and the covering 33 is illuminated. The shape of illumination light is, for example, circular.

In the case where the operation of the exterior member 100 is the operation of moving the document table 70 that is positioned at the covering position to the open position, the operation position is an exertion position on which the user exerts the movement force for moving the document table 70 that is positioned at the covering position to the open position. According to the exemplary embodiment, the exertion position corresponds to a range in the side plate 75 in the depth direction of the multifunction peripheral. As illustrated in FIG. 2 and FIG. 6, for example, the notification device 110 illuminates a range 110B in the central portion (an example of a portion) at the exertion position in the depth direction of the multifunction peripheral from above the document table 70. According to the exemplary embodiment, the side plate 75 of the document table 70 is not illuminated but the center of a right-hand edge portion of the top plate 71 in the depth direction of the multifunction peripheral is illuminated. The illumination indicates that the exertion position is present on the right-hand edge portion of the document table 70. The shape of illumination light is, for example, circular. The degree of the illumination light is smaller than the degree of illumination that indicates the placement position.

Detection with Detection Unit 150 and Camera 80

The detection unit 150 (see FIG. 10 and FIG. 11) is a component that detects the operation of the exterior member 100. Specifically, the detection unit 150 is configured by using a sensor that detects movement of the document table 70 from the covering position. An example of the detection unit 150 is an optical sensor (specifically, a reflection or transparent optical sensor) that receives light from a light-emitting portion with the document table 70 positioned at the covering position and that does not receive the light from the light-emitting portion with the document table 70 being away from the covering position. The detection unit 150 thus detects the operation of moving the document table 70 (specifically, start of the movement operation). The detection unit 150 transmits detection information about the detected operation of moving the document table 70 to the control device 160.

As for the multifunction peripheral 10, the camera 80 functions as a detection unit that detects the operation of the exterior member 100 as well. Specifically, the camera 80 detects the operation of placing the document G on the document table 70 that is positioned at the covering position and the covering 33. In the case where the camera 80 images the document G in the reading range MH, it is determined that the operation of placing the document G starts, and consequently, the operation of placing the document G is detected. The camera 80 transmits detection information about the detected operation of placing the document G to the control device 160.

Control Device 160

The control device 160 (see FIG. 10 and FIG. 11) controls the operation of components of the multifunction peripheral 10. For example, the control device 160 controls the components of the multifunction peripheral 10 such that the components perform processing, based on the instruction for performance that is inputted from the input unit 92. Specifically, as illustrated in FIG. 10, the control device 160 is configured by using a computer that includes a processor 161, a memory 162, and a storage 163.

An example of the processor 161 is a central processing unit (CPU) that is a general processor. An example of the processor may be a dedicated processor (for example, a graphics processing unit (GPU), an application specific integrated circuit (ASIC), a field programmable gate array (FPGA), or a programmable logic device) that is configurated by using a circuit that is dedicatedly designed to perform a specific process.

The storage 163 stores various programs that include a control program 163A (see FIG. 11) and various kinds of data. Specifically, the storage 163 includes a recording device such as a hard disk drive (HDD), a solid state drive (SSD), or a flash memory.

The memory 162 provides a work area for performing various programs by using the processor 161 and temporarily stores various programs and various kinds of data when the processor 161 performs processing. The processor 161 reads various programs that include the control program 163A from the storage 163 into the memory 162 and runs the programs with the memory 162 used as the work area.

The control device 160 runs the control program 163A by using the processor 161 for performing various functions. A functional configuration that is provided in cooperation with the processor 161 as a hardware resource and the control program 163A as a software resource will now be described. FIG. 11 is a block diagram illustrating the functional configuration of the processor 161.

As illustrated in FIG. 11, the processor 161 of the control device 160 functions as the reception unit 161A and a notification controller 161B by performing the control program 163A.

The reception unit 161A receives the instructions for performing various processes that include the process A. Specifically, the reception unit 161A receives the instruction for performing the process A when the user inputs the instruction for performing the process A by using the input unit 92.

The instruction for performing the process A includes various instructions that are inputted by the input unit 92 when the process A is performed. Examples of the various instructions include inputting the selected process A to be performed by the input unit 92 and inputting the set process condition for performing the process A by using the input unit 92.

For example, inputting the selected process A includes inputting the process A that is to be performed by the user and that is selected from various processes (for example, the scan process, the copy process, and the print process) that are displayed on the display unit 90 by using the input unit 92.

For example, inputting the set process condition includes inputting the process condition that the user sets by using the input unit 92, based on a process condition that is displayed on the display unit 90. In the case of the scan process, for example, the process condition includes the reading resolution, the reading method (reading with the reading unit 30 or reading with the camera 80), and the color setting (for example, monochrome reading or color reading). In the case of the copy process, for example, the process condition includes the size of the recording medium P and the magnification in addition to the reading resolution, the reading method, and the color setting described above.

The reception unit 161A receives detection information about the detected operation of the exterior member 100 from the detection unit 150 and the camera 80. Specifically, the reception unit 161A receives the detection information about the detected operation of moving the document table 70 from the detection unit 150. The reception unit 161A receives the detection information about the detected operation of placing the document G from the camera 80.

In the case where the reception unit 161A receives the instruction for performing the process A, the notification controller 161B controls the notification device 110 such that the notification device 110 notifies the user of the operation position of the exterior member 100. Consequently, the notification device 110 illuminates the operation position of the exterior member 100 described above.

According to the exemplary embodiment, for example, in the case where the reception unit 161A receives the input of the selected scan process or copy process as the process A, the notification device 110 illuminates the placement position on the document table 70 and the covering 33 and the exertion position on the document table 70.

In the case where the reception unit 161A receives the detection information about the detected operation of the exterior member 100, the notification controller 161B controls the notification device 110 such that the notification device 110 finishes notifying the user of the operation position of the exterior member 100. Consequently, the notification device 110 finishes illuminating the operation position of the exterior member 100.

In the case where the operation of the exterior member 100 is performed, the notification device 110 thus finishes notifying the user of the operation position of the exterior member 100. Specifically, according to the exemplary embodiment, in the case where the operation of the exterior member 100 starts, the notification device 110 finishes notifying the user.

According to the exemplary embodiment, for example, in the case where the operation of placing the document G on the document table 70 and the covering 33 or the operation of moving the document table 70 to the open position starts, the notification device 110 finishes illuminating the placement position on the document table 70 and the covering 33 and the exertion position on the document table 70.

Action According to Exemplary Embodiment

Action according to the exemplary embodiment will now be described.

The multifunction peripheral 10 includes the notification device 110 (see FIG. 10 and FIG. 11) that notifies the user of the position on the exterior member 100 to be operated by the user when the process A is performed in the case where the reception unit 161A receives the instruction for performing the process A.

According to the exemplary embodiment, in the case where the reception unit 161A receives the instruction for performing the scan process or the copy process, the notification device 110 exhibits a display that represents the position on which the user exerts the movement force for moving the document table 70. In this way, the user may grasp the position on which the user exerts the movement force for moving the document table 70.

According to the exemplary embodiment, the notification device 110 lights up a partial range at the exertion position on the document table 70. In this way, the range of lighting up that is narrower than that at the exertion position may allow the user to grasp the position on which the user exerts the movement force for moving the document table 70.

In the case where the reception unit 161A receives the instruction for performing the process (for example, the scan process or the copy process) that includes reading with the camera 80, the notification device 110 exhibits a display that represents a position at which the document G is to be placed on the document table 70. In this way, the user may grasp the position at which the document G the image of which is to be read by the camera 80 is to be placed.

According to the exemplary embodiment, the notification device 110 lights up a range in the central portion at the placement position on the document table 70. In this way, the range of lighting up that is narrower than that at the placement position allows the user to grasp the position at which the document G the image of which is to be read by the camera 80 is to be placed.

According to the exemplary embodiment, in the case where the operation of the exterior member 100 (for example, the operation of placing the document G on the document table 70 and the covering 33 or the operation of moving the document table 70 to the open position) is performed, the notification device 110 finishes notifying the user of the operation position of the exterior member 100 to be operated by the user. In this way, the user may grasp that the operation is performed at the right operation position.

According to the exemplary embodiment, in the case where the operation of the exterior member 100 (for example, the operation of placing the document G on the document table 70 and the covering 33 or the operation of moving the document table 70 to the open position) starts, the notification device 110 finishes notifying the user of the operation position of the exterior member 100 to be operated by the user. In this way, the user may grasp that the operation starts at the right operation position.

Modification to Notification Device 110

According to the exemplary embodiment, in the case where the reception unit 161A receives the input of the selected scan process or copy process, the notification device 110 illuminates the placement position on the document table 70 and the covering 33 and the exertion position on the document table 70. In addition to this, the illumination may be as follows. That is, the notification device 110 illuminates the placement position described above and the exertion position described above. Subsequently, for example, in the case where the reception unit 161A receives the input of a setting for the reading method (reading with the reading unit 30 or reading with the camera 80) as the process condition, the notification device 110 illuminates the operation position for the reading method.

For example, in the case where the reception unit 161A receives the input of a setting for reading with the reading unit 30, the notification device 110 finishes illuminating the placement position on the document table 70 and the covering 33 and continues illuminating the exertion position on the document table 70.

For example, in the case where the reception unit 161A receives the input of a setting for reading with the camera 80, the notification device 110 finishes illuminating the exertion position on the document table 70 and continues illuminating the placement position on the document table 70 and the covering 33.

With the configuration for receiving the input of the setting for the reading method (reading with the reading unit 30 or reading with the camera 80) as the process condition after the reception unit 161A receives the input of the selected scan process or copy process, the configuration may be as follows. That is, at the time the reception unit 161A receives the input of the selected scan process or copy process, the notification device 110 may not illuminate any position, but in the case where the reception unit 161A receives the input of the setting for the reading method, the notification device 110 may illuminate the operation position for the reading method. In the case where the reception unit 161A receives the input of the selected reading with the reading unit 30, the notification device 110 illuminates the exertion position on the document table 70. In the case where the reception unit 161A receives the input of the selected reading with the camera 80, the notification device 110 illuminates the placement position on the document table 70 and the covering 33.

With the configuration for inputting the selected scan process or copy process together with the input of the selected reading method (reading with the reading unit 30 or reading with the camera 80), in the case where the reception unit 161A receives the input of the selected scan process or copy process, for example, the notification device 110 may illuminate the operation position for the reading method. In the case where the reception unit 161A receives the input of the selected reading with the reading unit 30, the notification device 110 illuminates the exertion position on the document table 70. In the case where the reception unit 161A receives the input of the selected reading with the camera 80, the notification device 110 illuminates the placement position on the document table 70 and the covering 33.

According to the exemplary embodiment, the notification device 110 illuminates the central portion at the placement position on the document table 70 and the covering 33 but is not limited thereto. For example, the notification device 110 may illuminate the entire range at the placement position on the document table 70 and the covering 33 or may illuminate a partial range at the placement position except for the central portion. That is, the notification device 110 illuminates at least a partial range at the placement position on the document table 70 and the covering 33.

According to the exemplary embodiment, the notification device 110 illuminates the central portion at the exertion position on the document table 70 in the depth direction of the multifunction peripheral but is not limited thereto. For example, the notification device 110 may illuminate the entire range at the exertion position on the document table 70 or may illuminate a partial range at the exertion position except for the central portion in the depth direction of the multifunction peripheral. That is, the notification device 110 illuminates at least a partial range at the exertion position on the document table 70.

According to the exemplary embodiment, in the case where the operation of the exterior member 100 starts, the notification device 110 finishes notifying the user of the operation position of the exterior member 100 but is not limited thereto. For example, in the case where the operation of the exterior member 100 ends, the notification device 110 may finish notifying the user of the operation position of the exterior member 100, provided that the notification device 110 finishes notifying the user of the operation position of the exterior member 100 in the case where the operation of the exterior member 100 is performed.

According to the exemplary embodiment, the light source of the notification device 110 differs from the light source of the illumination device 88 that illuminates the document G but is not limited thereto. A part or the whole of the light source of the notification device 110 may double as the light source of the illumination device 88.

According to the exemplary embodiment, the notification device 110 illuminates the operation position from above the document table 70 but is not limited thereto. For example, the notification device 110 may illuminate the operation position from below the document table 70. In this case, the notification device 110 illuminates the operation position from below the document table 70 such that light passed therethrough.

According to the exemplary embodiment, the notification device 110 illuminates the operation position of the exterior member 100 but is not limited thereto. For example, the notification device 110 may be configured so as to cause the exterior member 100 itself to emit luminescence by using a light source such as a LED that is disposed at the operation position of the exterior member 100 to light up the operation position of the exterior member 100.

The notification device 110 lights up the operation position of the exterior member 100 but is not limited thereto. For example, the notification device 110 may be configurated so as to notify the user of the operation position of the exterior member 100 by using a voice that represents the operation position of the exterior member 100.

Modification to Image Forming Unit 12

Examples of the image forming unit are not limited to the image forming unit 12 described above. An example of the image forming unit may be an image forming unit that uses a direct transfer method in which the toner image forming members 20Y to 20K directly form the toner images on the recording medium P without using the transfer body 24. Another example of the image forming unit may be an image forming unit that forms an image by spraying ink to the recording medium P, provided that the image forming unit has a function of forming the image on the recording medium P.

Modification to Reading Unit 30

The reading unit 30 uses a contact image sensor as a functional unit that has a function of reading an image but is not limited thereto. An example of the functional unit may be an image sensor such as a CCD, provided that the functional unit is capable of reading the image.

According to the exemplary embodiment, the reading unit 30 includes the reading sensors 32 and 34 as functional units that have a function of reading an image but is not limited thereto. The reading unit 30 may be configurated so as to include only one of the reading sensors 32 and 34. That is, the reading unit 30 is capable of reading at least the image on one of the surfaces of the document G.

According to the exemplary embodiment, the covering 33 is thought to be a component that configurates a part of the reading unit 30 that includes the reading sensors 32 and 34 but is not limited thereto. For example, the covering 33 may be thought to be a component that configurates a part of a transport unit that includes the transport mechanism 40.

Modification to Camera 80

An example of the image that is read by the camera 80 is not limited to an image that includes, for example, a character, a picture, and a photograph. An example of the image that is read by the camera 80 may be a still image or a video image, provided that the camera 80 is capable of reading the image.

An example of the object is not limited to the document G. An example of the object may be a video device (such as a smart phone or a mobile terminal) that captures an image, provided that the camera 80 is capable of imaging the object.

The object may be any object, provided that the object is placed on the document table 70 and the covering 33. Accordingly, the camera 80 may be configurated so as to be capable of capturing not only the image but also the still image or video image of the object itself.

Modification to Document Table 70

As illustrated in FIG. 4, the upper surface 70A of the document table 70 is flush with the top surface 35A of the top plate 35 but is not limited thereto. The upper surface 70A of the document table 70 and the top surface 35A of the top plate 35 may have a step. For example, the step is formed such that the document is supported in the posture that is suitable for being read by the camera 80.

The document table 70 doubles as the covering that covers the document table 50 as described above but is not limited thereto. The multifunction peripheral 10 may include a covering that differs from the document table 70 and that covers the document table 50. In this case, a display is exhibited on the covering.

Other Modifications

As for the multifunction peripheral 10, the entire top surface 35A of the top plate 35 of the reading unit 30 and the entire upper surface 70A of the document table 70 are flat but are not limited thereto. For example, the top surface 35A of the top plate 35 of the reading unit 30 and the upper surface 70A of the document table 70 may be flat at least in the reading range of the camera 80 and may have unevenness outside the reading range of the camera 80.

The multifunction peripheral 10 is configured such that the document G the image of which is read by the camera 80 is placed on the document table 70 that is positioned at the covering position and the top surface 35A of the top plate 35 of the reading unit 30 but may be configured such that the document G is placed on only the document table 70. In this case, the reading range MH of the camera 80 may be a range that covers only the document table 70.

As for the multifunction peripheral 10, the document table 70 is used as an example of the placement portion but is not limited thereto. As for the multifunction peripheral 10, for example, the document table 50 may be used as an example of the placement portion. That is, an object such as the document G the image of which is read by the camera 80 may be placed on the document table 50. In this case, for example, the document table 70 may be configured so as to be secured at the open position or the document table 70 may not be provided.

The present disclosure is not limited to the embodiment described above but may be modified, altered, and improved in various ways without departing from the spirit thereof. For example, the modifications described above may be configured by appropriately combining some of these.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A multifunction peripheral comprising:
an exterior member that corresponds to an exterior portion of the multifunction peripheral and that differs from an input unit that inputs an instruction for a program;
a reception unit that receives an instruction for performing a process that involves an operation of the exterior member;
a notification unit that notifies a user of a position on the exterior member to be operated by the user of the multifunction peripheral when the process is performed in a case where the reception unit receives the instruction for performance;
a placement portion on which a document is placed; and
a movement unit that is included in the exterior member and that is capable of moving to a covering position at which the movement unit covers the placement portion and an open position at which the movement unit uncovers an upper surface of the placement portion.

2. The multifunction peripheral according to claim 1, further comprising:
a transport mechanism that transports the document that is placed on the placement portion; and
a reading unit that reads an image of the document that is transported by the transport mechanism,
wherein the notification unit displays a notification that represents an exertion position on which the user exerts movement force for moving the movement unit in a case where the reception unit receives the instruction for performing the process that includes reading with the reading unit.

3. The multifunction peripheral according to claim 2, wherein the notification unit lights up a partial range at the exertion position.

4. The multifunction peripheral claim 3, further comprising:
a camera that is capable of reading an image of an object that is placed on the movement unit, wherein the movement unit is a table,
wherein the notification unit displays a notification that represents a position at which the object is to be placed on the table in a case where the reception unit receives the instruction for performing the process that includes reading with the camera.

5. The multifunction peripheral according to claim 4, wherein the notification unit lights up a range in a central portion at the position at which the object is to be placed.

6. The multifunction peripheral according to claim 5, wherein the notification unit finishes notifying the user in a case where the operation of the exterior member is performed.

7. The multifunction peripheral according to claim 4, wherein the notification unit finishes notifying the user in a case where the operation of the exterior member is performed.

8. The multifunction peripheral according to claim 3, wherein the notification unit finishes notifying the user in a case where the operation of the exterior member is performed.

9. The multifunction peripheral claim 2, further comprising:
a camera that is capable of reading an image of an object that is placed on the movement unit, wherein the movement unit is a table,
wherein the notification unit displays a notification that represents a position at which the object is to be placed on the table in a case where the reception unit receives the instruction for performing the process that includes reading with the camera.

10. The multifunction peripheral according to claim 9,
wherein the notification unit lights up a range in a central portion at the position at which the object is to be placed.

11. The multifunction peripheral according to claim 10,
wherein the notification unit finishes notifying the user in a case where the operation of the exterior member is performed.

12. The multifunction peripheral according to claim 9,
wherein the notification unit finishes notifying the user in a case where the operation of the exterior member is performed.

13. The multifunction peripheral according to claim 2,
wherein the notification unit finishes notifying the user in a case where the operation of the exterior member is performed.

14. The multifunction peripheral according to claim 13,
wherein the notification unit finishes notifying the user in a case where the operation of the exterior member starts.

15. The multifunction peripheral according to claim 1,
wherein the notification unit finishes notifying the user in a case where the operation of the exterior member is performed.

16. The multifunction peripheral according to claim 15,
wherein the notification unit finishes notifying the user in a case where the operation of the exterior member starts.

17. A multifunction peripheral comprising:
an exterior member that corresponds to an exterior portion of the multifunction peripheral and that differs from an input unit that inputs an instruction for a program;
a reception unit that receives an instruction for performing a process that involves an operation of the exterior member;
a notification unit that notifies a user of a position on the exterior member to be operated by the user of the multifunction peripheral when the process is performed in a case where the reception unit receives the instruction for performance;
a table on which an object is placed, the table being included in the exterior member to be operated; and
a camera that is capable of reading an image of the object that is placed on the table,
wherein the notification unit displays a notification that represents a position at which the object is to be placed on the table in a case where the reception unit receives the instruction for performing the process that includes reading with the camera.

18. The multifunction peripheral according to claim 17,
wherein the notification unit lights up a range in a central portion at the position at which the object is to be placed.

19. The multifunction peripheral according to claim 18,
wherein the notification unit finishes notifying the user in a case where the operation of the exterior member is performed.

20. The multifunction peripheral according to claim 17,
wherein the notification unit finishes notifying the user in a case where the operation of the exterior member is performed.

* * * * *